(12) United States Patent
Kawasaki

(10) Patent No.: US 10,532,413 B2
(45) Date of Patent: Jan. 14, 2020

(54) FASTENING STRUCTURE, HEAD, AND SHANK

(71) Applicant: TUNGALOY CORPORATION, Fukushima (JP)

(72) Inventor: Sozo Kawasaki, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 0 days.

(21) Appl. No.: 16/042,676

(22) Filed: Jul. 23, 2018

(65) Prior Publication Data

US 2019/0118274 A1 Apr. 25, 2019

(30) Foreign Application Priority Data

Oct. 19, 2017 (JP) .................. 2017-202314

(51) Int. Cl.
*B23B 31/11* (2006.01)
*B23C 5/10* (2006.01)
*B23B 27/00* (2006.01)
*B23B 29/04* (2006.01)

(52) U.S. Cl.
CPC .............. *B23C 5/10* (2013.01); *B23B 27/007* (2013.01); *B23B 29/046* (2013.01); *B23B 31/11* (2013.01); *B23B 2251/02* (2013.01); *B23B 2260/138* (2013.01); *B23C 2210/02* (2013.01)

(58) Field of Classification Search
CPC ......... B23C 1/00; B23C 2210/02; B23C 5/10; B23C 5/26; B23B 29/046; B23B 29/04; B23B 29/20; B23B 31/1071
See application file for complete search history.

(56) References Cited

U.S. PATENT DOCUMENTS

| | | | | |
|---|---|---|---|---|
| 756,339 | A | * | 4/1904 | Down ........................ 175/394 |
| 2,532,632 | A | * | 12/1950 | MacArthur ......... E21B 17/0423 |
| | | | | 285/332.2 |
| 4,655,655 | A | * | 4/1987 | Schurfeld ............. B23B 29/046 |
| | | | | 403/380 |

(Continued)

FOREIGN PATENT DOCUMENTS

| | | |
|---|---|---|
| JP | S60-48471 U | 4/1985 |
| JP | H02-23418 Y2 | 6/1990 |
| JP | 2003-532844 A | 11/2003 |

*Primary Examiner* — Nicole N Ramos
(74) *Attorney, Agent, or Firm* — Studebaker & Brackett PC

(57) ABSTRACT

Provided is a fastening structure having a wide application range and a high degree of freedom of design. A fastening structure includes: a head including a first end surface and a first screw part formed on the first end surface; and a shank including a second end surface and a second screw part formed on the second end surface and threadedly engaging with the first screw part. The first end surface includes a first principal surface oriented in an axial direction of the first screw part and a first step surface oriented in a rotational direction of the first screw part. The second end surface includes a second principal surface oriented in an axial direction of the second screw part and a second step surface oriented in a rotational direction of the second screw part. The first and second principal surfaces face each other and the first and second step surfaces face each other when the first screw part threadedly engages with the second screw part.

19 Claims, 7 Drawing Sheets

(56) References Cited

U.S. PATENT DOCUMENTS

| | | | | |
|---|---|---|---|---|
| 4,998,851 A | * | 3/1991 | Hunt | B23B 27/007 188/268 |
| 5,169,183 A | * | 12/1992 | Hallez | E21B 17/042 285/334 |
| 6,241,433 B1 | * | 6/2001 | Rydberg | B23B 31/11 279/8 |
| 7,001,114 B2 | * | 2/2006 | Blucher | B23B 27/007 407/103 |
| 7,329,073 B2 | * | 2/2008 | Jonsson | B23B 31/11 279/8 |
| 8,864,425 B2 | * | 10/2014 | Osawa | B23B 51/02 408/144 |
| 2001/0041089 A1 | | 11/2001 | Hecht | |
| 2003/0059264 A1 | * | 3/2003 | Hansson | B23B 27/00 407/66 |
| 2006/0073744 A1 | * | 4/2006 | Jonsson | B23B 31/11 439/884 |
| 2009/0010709 A1 | * | 1/2009 | Berglow | B23B 31/11 403/343 |
| 2015/0217380 A1 | * | 8/2015 | Haimer | B23B 31/005 279/99 |
| 2015/0290718 A1 | | 10/2015 | Freyermuth et al. | |

\* cited by examiner

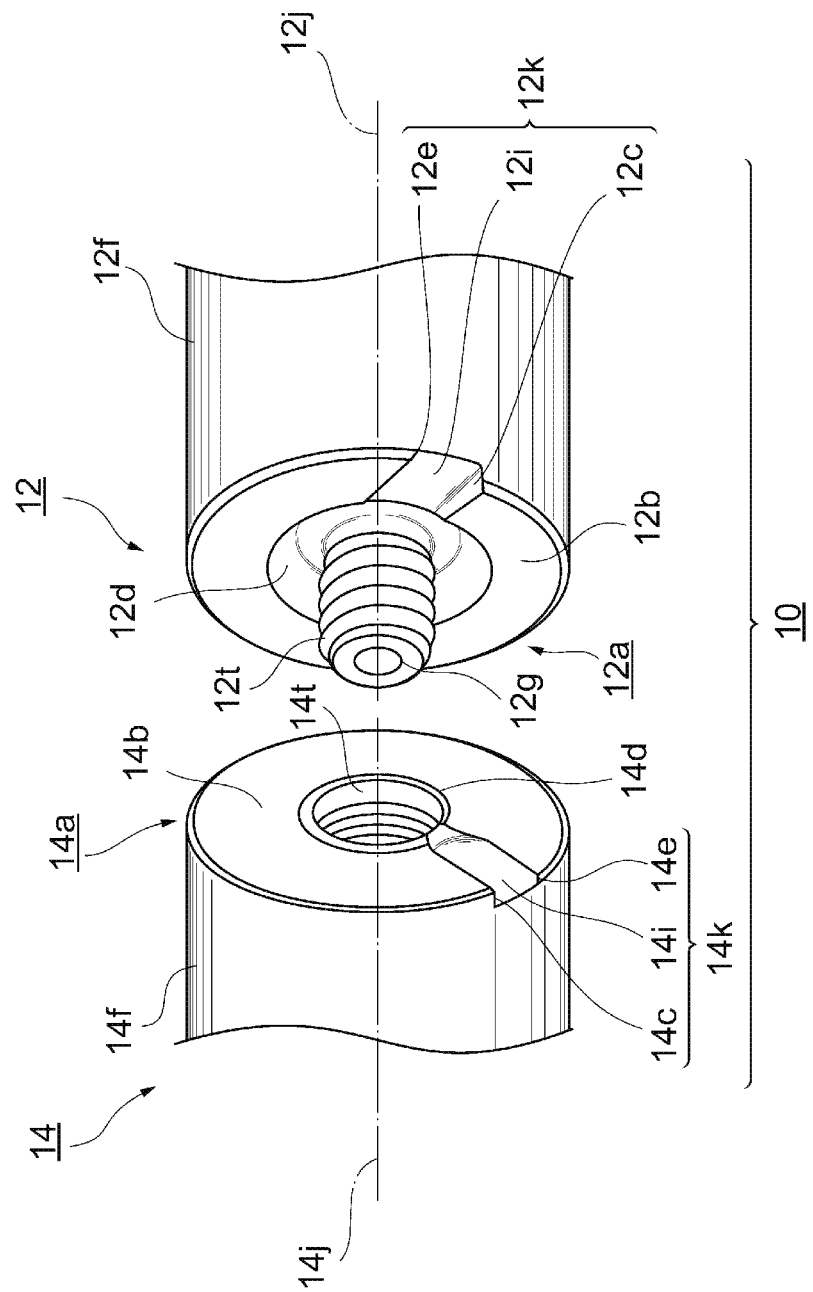

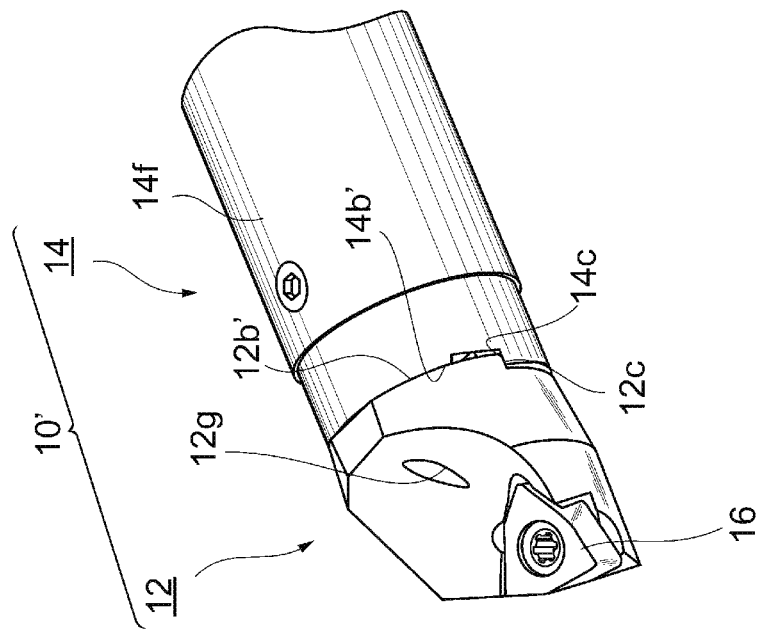
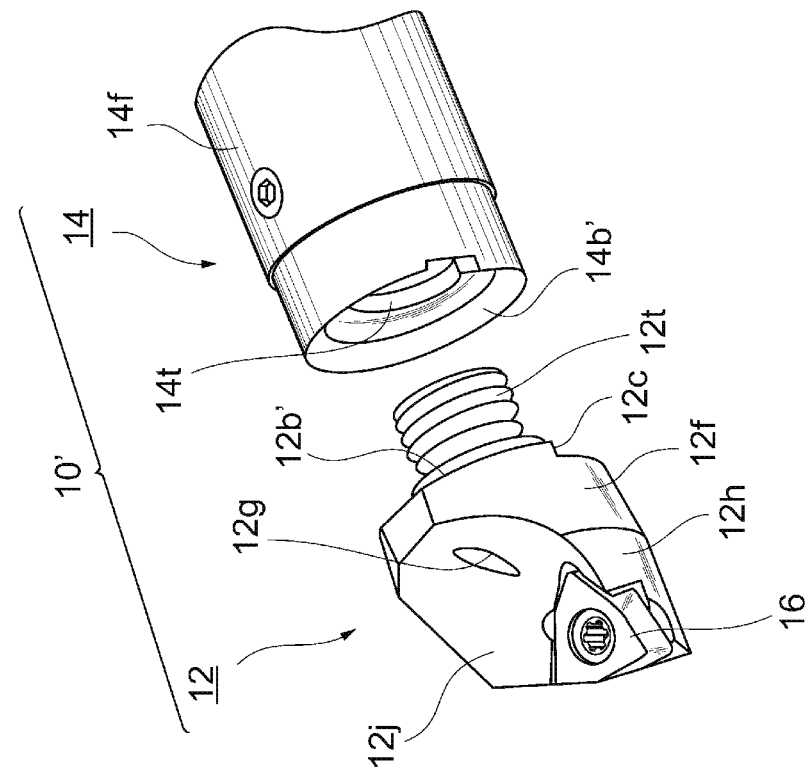

FASTENING STRUCTURE, HEAD, AND SHANK

BACKGROUND

Field

The present invention relates to a fastening structure, a head, and a shank.

Description of Related Art

Japanese Translation of PCT Application No. 2003-532844 discloses a tool (20) constituted by a male member (22) and a female member (24). The male member (22) has a coupling portion (28) protruding reward from a body portion (26), and the coupling portion (28) has a front portion (40) having a truncated conical shape and a rear portion (38) with a screw. The female member (24) has a hole (64) expanding rearward from a front surface (60). The hole (62) has a front portion (70) having a truncated conical shape and a rear portion (72) with a screw. When the male member (22) and the female member (24) are screw-coupled to each other for coupling, the screw portion (38) of the male member (22) engages with the screw portion (72) of the female member (24).

U.S. Patent Application Publication No. 2015/0290718 (Specification) discloses an assembly in which a male member 1 and a female member 2 are fastened to each other. The assembly has an annular part 3 on the side of the outside diameter of the female member 2. Further, the annular part 3 threadedly engages with a peripheral part 4 formed on the side of the outside diameter of the male member 1 to fasten the male member 1 and the female member 2 to each other.

SUMMARY

However, since it is not possible to perform the adjustment of the rotational angle of the male member (22) relative to the female member (24), the fastening structure of Japanese Translation of PCT Application No. 2003-532844 does not enable accurate positioning.

In addition, since the fastening structure of U.S. Patent Application Publication No. 2015/0290718 (Specification) preferably requires the formation the peripheral part 4 and the annular part 3 threadedly engaging with the peripheral part 4 on the side of the outside diameter of the male member 1 and the female member 2, respectively, the application of the fastening structure is limited only to a head and a shank having a prescribed diameter or more (for example, 34 mm or more).

In view of the above problems, it is an object of the present invention to provide a fastening structure, a head, and a shank having a wide application range and a high degree of freedom of design.

According to an aspect of the present invention, a fastening structure includes: a head including a first end surface and a first screw part formed on the first end surface; and a shank including a second end surface and a second screw part formed on the second end surface and threadedly engaging with the first screw part. The first end surface includes a first principal surface oriented in an axial direction of the first screw part and a first step surface oriented in a rotational direction of the first screw part, the second end surface includes a second principal surface oriented in an axial direction of the second screw part and a second step surface oriented in a rotational direction of the second screw part. The first principal surface and the second principal surface face each other and the first step surface and the second step surface face each other when the first screw part threadedly engages with the second screw part.

Since the aspect enables positioning using a first end surface and a first step surface formed on the end surface of a head and a second end surface and a second step surface formed on the end surface of a shank, it is possible to provide a fastening structure having a wide application range and a high degree of freedom of design.

According to another aspect of the present invention, a head is capable of being fastened to a shank including a second end surface and a second screw part formed on the second end surface, the second end surface including a second principal surface oriented in an axial direction of the second screw part and a second step surface oriented in a rotational direction of the second screw part. The head includes: a first end surface; and a first screw part formed on the first end surface and threadedly engaging with the second screw part. The first end surface includes a first principal surface oriented in an axial direction of the first screw part and a first step surface oriented in a rotational direction of the first screw part. The first principal surface and the second principal surface face each other and the first step surface and the second step surface face each other when the first screw part threadedly engages with the second screw part.

Since the aspect enables positioning using a first principal surface and a first step surface with respect to a shank including a second principal surface and a second step surface, it is possible to provide a head having a wide application range and a high degree of freedom of design.

According to another aspect of the present invention, a shank is capable of being fastened to a head including a first end surface and a first screw part formed on the first end surface, the first end surface including a first principal surface oriented in an axial direction of the first screw part and a first step surface oriented in a rotational direction of the first screw part. The shank includes: a second end surface; and a second screw part formed on the second end surface and threadedly engaging with the first screw part. The second end surface includes a second principal surface oriented in an axial direction of the second screw part and a second step surface oriented in a rotational direction of the second screw part. The first principal surface and the second principal surface face each other and the first step surface and the second step surface face each other when the first screw part threadedly engages with the second screw part.

Since the aspect enables positioning using a second principal surface and a second step surface with respect to a head including a first principal surface and a first step surface, it is possible to provide a shank having a wide application range and a high degree of freedom of design.

According to the present invention, it is possible to provide a fastening structure, a head, and a shank having a wide application range and a high degree of freedom of design.

BRIEF DESCRIPTION OF DRAWINGS

FIG. 1 is a view showing a fastening structure 10 constituted by a head 12 and a shank 14 according to an embodiment;

FIGS. 3A and 3B are views in which the fastening structure 10 is applied to a head 12 holding an insert 16;

DETAILED DESCRIPTION

Embodiment

Hereinafter, a description will be given in detail of an embodiment of the present invention with reference to the drawings. Note that the same elements will be denoted by the same symbols and their duplicated descriptions will be omitted. In addition, the following embodiment is given only for describing the present invention, and the present invention is not limited to the embodiment. Moreover, the present invention is capable of being modified in various ways without departing from its spirit.

Figure 2A:
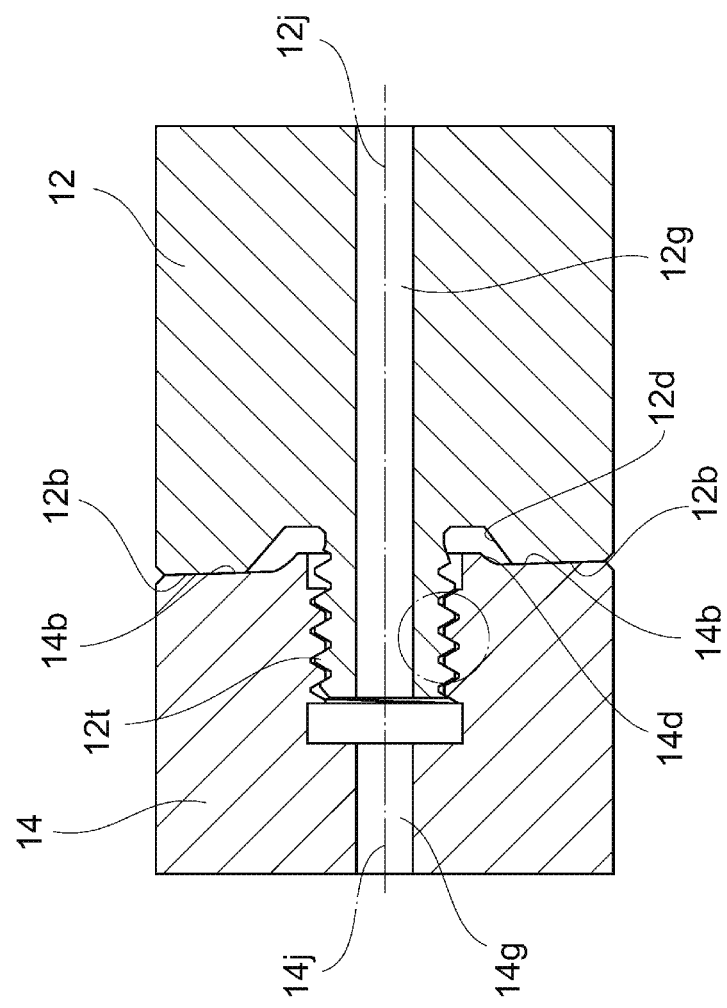
FIGS. 2A and 2B are cross-sectional views of the head 12 and the shank 14 fastened to each other.

FIG. 1 shows a fastening structure 10 constituted by a head 12 and a shank 14 according to the embodiment. FIG. 2A is a cross-sectional view taken along a rotational axis 12j and a rotational axis 14j when the head 12 and the shank 14 are fastened to each other.

The head 12 includes an end surface 12a (first end surface) and a lateral face 12f. On the other end side relative to the end surface 12a, the head 12 includes a cutting part 12h (not shown) for holding a cutting tool and may detachably hold the cutting tool or fixedly hold the same by soldering or the like. Note that the head 12 may be a cutting insert.

The head 12 has a screw part 12t (first screw part) having a male screw with the axis 12j (that will be called the axis 12j or the rotational axis 12j) as a rotational axis, the screw part 12t being formed to protrude from the central part of the end surface 12a in the direction of the rotational axis 12j. The end surface 12a includes a principal surface 12b (first principal surface) oriented in the direction of the rotational axis 12j and a step surface 12c (first step surface) connected to the principal surface 12b and oriented in the rotational direction of the screw part 12t.

The male screw of the screw part 12t has a pitch of Pt. In addition, the male screw has a through-hole 12g opening at its end and opening up to the other end surface (not shown) of the head 12 in the direction of the rotational axis 12j.

When seen in the direction of the rotational axis 12j, the principal surface 12b is formed in the area of the half or more (for example, 320° or more) of the circumference of the end surface 12a. In addition, the principal surface 12b is constituted by a slant surface slanted from a plane perpendicular to the rotational axis 12j and included on a spiral surface progressing by a pitch Pc (first pitch) in the direction of the rotational axis 12j when rotated by 360° about the rotational axis 12j at a position away from the rotational axis 12j by a certain distance. The pitch Pc is smaller than the pitch Pt of the screw part 12t.

The step surface 12c is formed to be almost perpendicular to the principal surface 12b and almost parallel to the rotational axis 12j. By the provision of the step surface 12c, a plane part 12i connected to the step surface 12c and perpendicular to the rotational axis 12j, and a step surface 12e rising substantially perpendicularly from the plane part 12i and connected to the other end of the principal surface 12b, the length of the step surface 12c in the direction of the rotational axis 12j may be made greater than the pitch Pc. In addition, roundness (a fillet) for mitigating stress concentration when the step surface 12c contacts is provided between the step surface 12c and the plane part 12i. In the embodiment, the length of the step surface 12c in the direction of the rotational axis 12j is formed to be the same as or slightly greater than the pitch Pt.

A portion constituted by the step surface 12c, the plane part 12i, and the step surface 12e will be called a first key part 12k. As will be described in detail later, the positioning of the positioning head 12 in its rotational direction with respect to the shank 14 may be realized by the formation of the first key part 12k.

As shown in FIG. 1, the end surface 12a further includes a concave part 12d in the direction of the inside diameter of the principal surface 12b formed into a ring shape about the rotational axis 12j. The concave part 12d and the screw part 12t are connected to each other.

The shank 14 has a substantially cylindrical shape including an end surface 14a (second end surface) and a lateral face 14f.

The shank 14 has a screw part 14t (second screw part) having a female screw with the axis 14j (that will be called the axis 14j or the rotational axis 14j) as a rotational axis in the direction of the rotational axis 14j from the central part of the end surface 14a. The end surface 14a includes a principal surface 14b (second principal surface) oriented in the direction of the rotational axis 14j and a step surface 14c (second step surface) connected to the principal surface 14b and oriented in the rotational direction of the screw part 14t.

Since the female screw of the screw part 14t has a pitch of Pt, the female screw threadedly engages with the male screw of the screw part 12t. In addition, the shank 14 has a through-hole 14g (second through-hole) opening into the bottom surface of the female screw and extending in the direction of the rotational axis 14j. As shown in FIG. 2A, a coolant (water-soluble oil for cutting) may be supplied via the through-holes 12g and 14g.

When seen in the direction of the rotational axis 14j, the principal surface 14b is formed in the area of the half or more (for example, 320° or more) of the circumference of the end surface 14a. In addition, the principal surface 14b is constituted by a slant surface slanted from a plane perpendicular to the rotational axis 14j and included on a spiral surface progressing by a pitch Pc' (second pitch) in the direction of the rotational axis 14j when rotated by 360° about the rotational axis 14j at a position away from the rotational axis 14j by a certain distance. In the embodiment, the pitches Pc and Pc' have the same value, and both the pitches are smaller than the pitch Pt of the screw part 14t.

The step surface 14c is formed to be almost perpendicular to the principal surface 14b and almost parallel to the rotational axis 14j. By the provision of the step surface 14c, a plane part 14i connected to the step surface 14c and perpendicular to the rotational axis 14j, and a step surface 14e rising substantially perpendicularly from the plane part 14i and connected to the other end of the principal surface 14b, the length of the step surface 14c in the direction of the rotational axis 14j may be made greater than the pitch Pc'. In addition, roundness (a fillet) for mitigating stress concentration when the step surface 14c contacts is provided between the step surface 14c and the plane part 14i. In the embodiment, the length of the step surface 14c in the direction of the rotational axis 14j is formed to be the same as or slightly greater than the pitch Pt.

A portion constituted by the step surface 14c, the plane part 14i, and the step surface 14e will be called a second key part 14k.

As shown in FIG. 2A, the end surface 14a further includes a convex part 14d in the direction of the inside diameter of the principal surface 14b formed into a ring shape about the rotational axis 14j. The inside wall of the convex part 14d is caused to serve as a release part, and the screw part 14t is provided to be connected to the release part.

FIG. 2A is the cross-sectional view taken along the rotational axis 12j and the rotational axis 14j when the head 12 and the shank 14 are fastened to each other. As shown in FIG. 2A, the principal surfaces 12b and 14b adhere closely to each other during fastening. In addition, their boundary line is slanted relative to a straight line perpendicular to the rotational axis 12j (and the rotational axis 14j). Since the through-holes 12g and 14g communicate with each other at this time, the coolant may be supplied to the side of the cutting part 12h via the through-holes 12g and 14g.

Figure 2B:
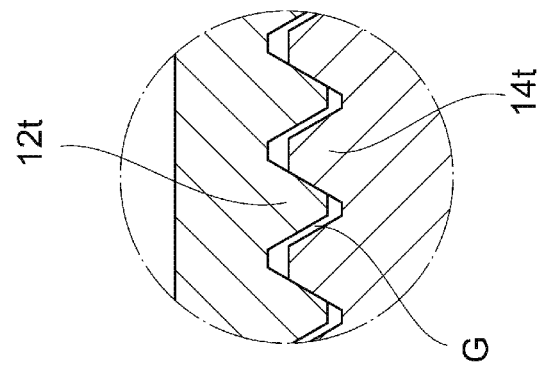

FIG. 2B is an enlarged view of an area A including the screw part 12t on the side of the head 12 and the screw part 14t on the side of the shank 14 shown in FIG. 2A.

As shown in FIG. 2B, a gap G for smoothly rotating the male screw is formed at the space between the screw thread of the female screw of the screw part 14t and the screw thread of the male screw of the screw part 12t. In addition, one surface (surface oriented in a left direction in FIG. 2B) among two slant surfaces of the screw thread constituting the male screw of the screw part 12t contacts the screw thread of the female screw of the screw part 14t, but the other surface (surface oriented in a right direction in FIG. 2B) among the two slant surfaces does not contact the screw thread of the female screw of the screw part 14t. In other words, the male screw of the screw part 12t expands due to its slight elastic deformation, and a stress occurs in the right direction of FIG. 2B.

That is, the principal surfaces 12b and 14b contact each other when the male screw of the screw part 12t of the head 12 and the female screw of the screw part 14t of the shank 14 are threadedly engaged with each other to move the head 12 in the direction of the shank 14. The position of the principal surface 14b remains almost the same. Therefore, when the screw part 12t is further rotated, the male screw of the screw part 12t expands due to its slight elastic deformation after receiving a stress toward its progressing direction from the female screw of the screw part 14t.

FIG. 3A shows a fastening structure 10' in which the fastening structure 10 shown in FIG. 1 is applied to a head 12 holding an insert 16. Compared with the fastening structure 10 of FIG. 1, the fastening structure 10' is different in that principal surfaces 12b' and 14b' are greatly tilted relative to axes 12j and 14j, respectively. Since other elements are the same as those of the fastening structure 10 shown in FIG. 1, they will be denoted by the same symbols and their duplicated descriptions will be omitted.

A curved surface 12j of the head 12 on its side opposite to an end surface 12a oriented in the direction of the side of a shank 14 is a smooth curved surface as shown in FIG. 3A, and one end of a through-hole 12g opens into the curved surface 12j. Therefore, a coolant may be supplied in the direction of the insert 16 from the through-hole 12g. In addition, the head 12 is provided with a cutting part 12h including a tip seat at its tip end communicating with the curved surface 12j and may detachably hold the insert 16 using a clamp screw.

FIG. 3B shows a state in which the male screw of a screw part 12t of the head 12 and the female screw of a screw part 14t of the shank 14 shown in FIG. 3A are threadedly engaged with and fastened to each other.

As shown in FIG. 3B, the principal surfaces 12b' and 14b' include a part of a spiral surface having the same pitch Pc. Therefore, during fastening, the principal surfaces 12b' and 14b' face each other in the directions of the rotational axes 12j and 14j and adhere closely to each other in plenty of their areas. In addition, a first step surface 12c and a second step surface 14c face each other in the peripheral direction of the rotational axes 12j and 14j (and the rotational direction of the screws). Therefore, the step surfaces 12c and 14c serving as stoppers may prevent the rotation of the screws. Accordingly, the fastening structure 10' enables accurate positioning based on the step surfaces 12c and 14c.

In addition, since the coolant supplied from the side of the shank 14 may be directly jetted into the insert 16 from the through-hole 12g, the fastening structure 10' enables effective cooling.

Figure 4:
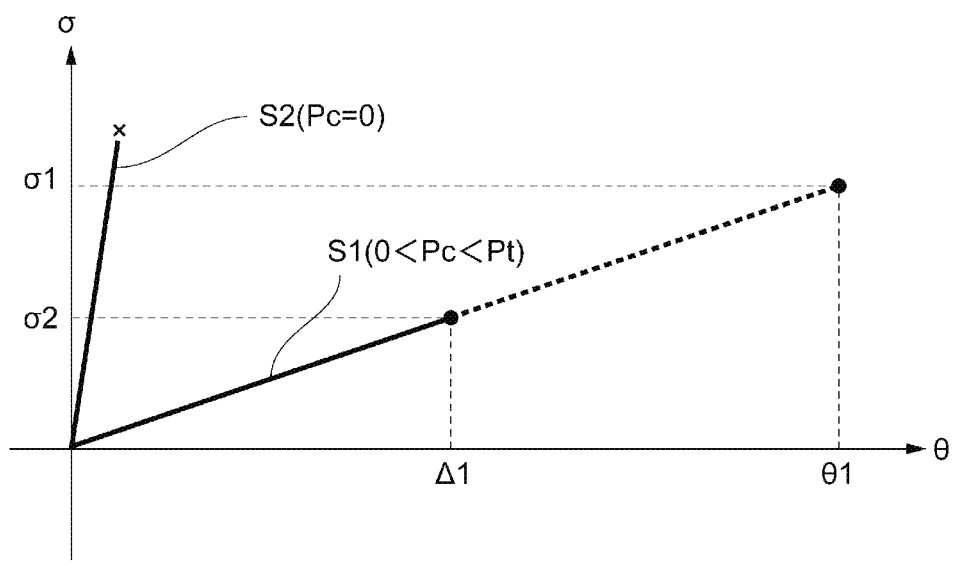
FIG. 4 is a graph in which a rotational angle is shown in a horizontal axis and a generated stress is shown in a vertical axis.

Note that an antivibration damper (not shown) may be provided in the shank 14. FIG. 4 is a graph in which a rotational angle θ after the principal surface 12b (or the principal surface 12b') and the principal surface 14b (or the principal surface 14b') contact each other is shown in a horizontal axis and a stress σ acting on the screw part 12t after the principal surfaces contact each other is shown in a vertical axis. Here, Δθ shows a rotational angle until the first step surface 12c and the second step surface 14c face and contact each other (or come substantially close to each other). In addition, σ1 shows a yield stress at which the screw part 12t yields.

In the graph, a straight line S1 shows the relationship between the rotational angle and the stress when the relationship 0<Pc<Pt is established. In addition, a straight line S2 shows the relationship between the rotational angle and the stress when the relationship Pc=0 is established.

First, in the case of the straight line S2, the principal surface 12b becomes a plane perpendicular to the rotational axis 12j (or becomes a curved surface that does not move in the direction of the rotational axis 12j when rotated by 360°) since the relationship Pc=0 is established. In this case, after the principal surfaces 14b and 12b contact each other, the principal surface 12b is scarcely able to move in the direction of the rotational axis 12j even when the screw part 12t is rotated. Therefore, the stress rapidly increases even with the slight rotation of the screw part 12t. Accordingly, the screw part 12t leads to a yield point and plastically deforms before rotating by Δθ.

On the other hand, since the relationship 0<Pc is established in the case of the straight line S1, the principal surface 12b moves at the pitch Pc in the direction of the rotational axis 12j when the screw part 12t is rotated. In addition, since the relationship Pc<Pt is established, the screw part 12t moves at the greater pitch Pt. That is, the stretching of the screw part 12t relative to the principal surface 12b is (Pt−Pc)×(rotational angle θ/360°). Accordingly, a stress σ2 at a point at which the screw part 12t rotates by Δθ is smaller than σ1, and the screw part 12t may avoid its plastic deformation.

Δθ is the rotational angle until the first step surface 12c and the second step surface 14c face and contact each other (or come substantially close to each other) after the principal surfaces 12b and 14b contact each other. Therefore, the rotational angle Δθ is a value that fluctuates with the manufacturing errors, environments during fastening, or the like of the shank 14 and the head 12. However, by causing Δθ to fall within θ1 or less (for example, 180° or less) at most and setting Pc so that the stress generated when the screw part 12*t* rotates by θ1 becomes less than the yield stress, it becomes possible to avoid the plastic deformation of the screw part 12*t* and fasten and fix the shank 14 and the head 12 to each other within the range of their elastic deformation. For example, the screw parts 12*t* and 14*t* having a pitch of Pt=1.25 mm and standardized as M8 screws may have a pitch of Pc=1.15 mm (that is, about 90% the pitches of the screws).

In addition, even by changing the length of the screw part 12*t* including the cylindrical part rather than setting Pc, it is possible to adjust an angle until the screw part 12*t* leads to the yield stress. For example, assuming that the yield stress is 1200 MPa and parts other than the screw part 12*t* are rigid bodies, the screw part 12*t* leads to the yield stress at 133° (at the position at which the tip end of the screw part 12*t* moves by 0.037 mm in the direction of the rotational axis 12*j* from the position of the tip end of the screw part 12*t* when the first step surface 12*c* and the second step surface 14*c* face each other) when the screw part 12*t* is set to have a length of 6.5 mm. On the other hand, the screw part 12*t* leads to the yield stress at 205° (at the position at which the tip end of the screw part 12*t* moves by 0.057 mm in the direction of the rotational axis 12*j* from the position of the tip end of the screw part 12*t* when the first step surface 12*c* and the second step surface 14*c* face each other) when the screw part 12*t* is set to have a length of 10 mm. However, an increase in the length of the screw part 12*t* results in a disadvantage that the moment acting on a force perpendicular to the rotational axis 12*j* becomes great. Therefore, the length of the screw part 12*t* is preferably appropriately selected according to an intended purpose.

Figure 5A:
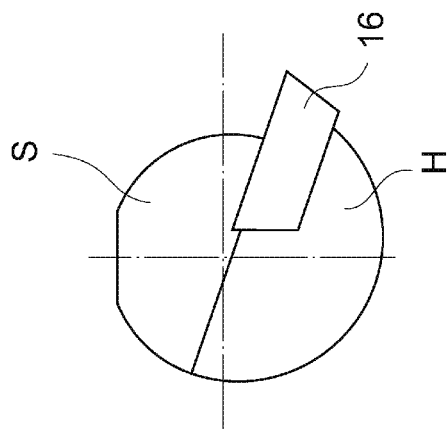
FIGS. 5A to 5C are explanatory views of the effects of the fastening structure 10.
Figure 5B:
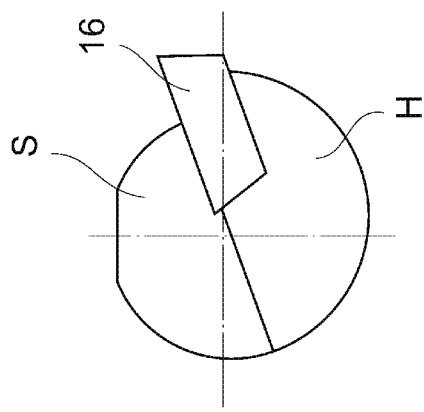
Figure 5C:
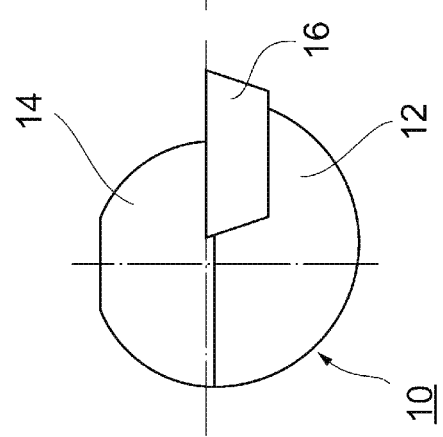

FIGS. 5A to 5C are views for describing the effects of the fastening structure 10 according to the embodiment and the fastening structure 10' of the comparative example. FIG. 5A shows a state in which the blade tip of a cutting tool 16 held by the cutting part 12*h* is positioned with respect to the shank 14 and its reference surface using the fastening structure 10 according to the embodiment. That is, by designing the cutting part 12*h* so that the cutting tool 16 is properly positioned when the first step surface 12*c* and the second step surface 14*c* face and contact each other (or come substantially close to each other), it becomes possible to perform accurate positioning of the cutting tool 16 using the fastening structure 10.

FIGS. 5B and 5C show the case of the comparative example in which the head H and the insert 16 held by the head H are fastened to the shank S in a state of being deviated from a reference surface.

Figure 6:
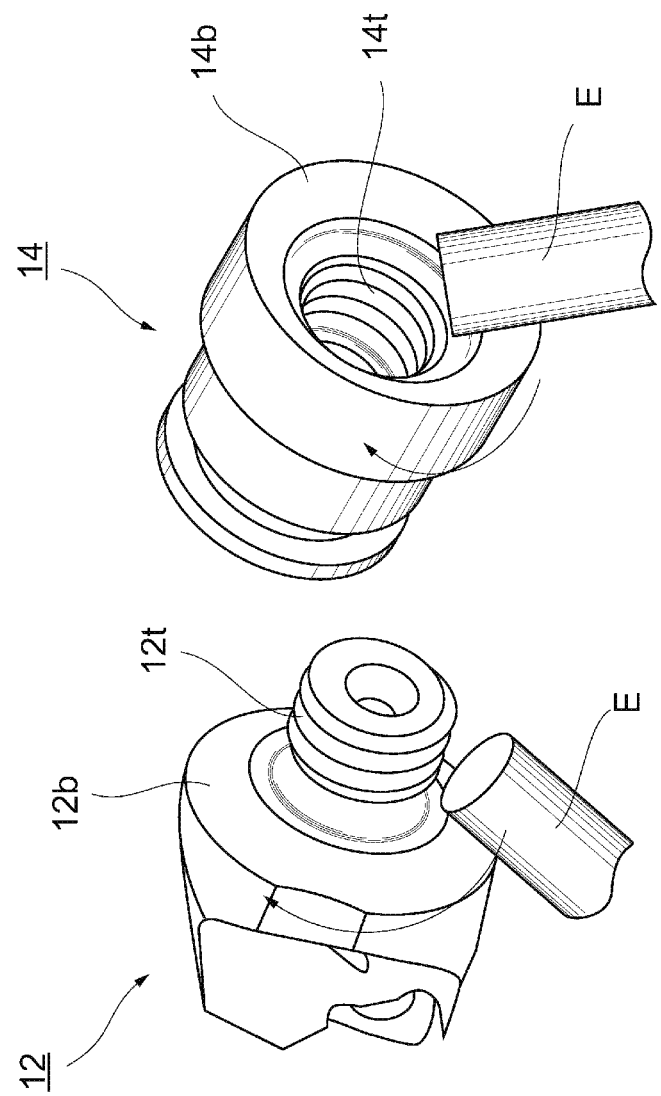
FIG. 6 is a view showing the processing state of principal surfaces 12b' and 14b'.

FIG. 6 shows the processing state of manufacturing the head 12 and the shank 14 shown in FIGS. 3A and 3B. As shown in FIGS. 6A and 6B, each of the principal surface 12*b'* of the head 12 and the principal surface 14*b'* of the shank 14 contacting the principal surface 12*b'* may be cut at a machining center using an end mill E. By constituting the principal surfaces 12*b'* and 14*b'* by a spiral surface or one or a plurality of slant surfaces so that the relationship 0<Pc<Pt is established as described above, it becomes possible to realize the fastening structure within the range of its elastic deformation. Here, the tapered angles of the principal surfaces 12*b'* and 14*b'* may be appropriately set with respect to the rotational axes 12*j* and 14*j*. With the tapered angles, the principal surfaces 12*b'* and 14*b'* are enabled to have strength with respect to a stress in a direction perpendicular to the rotational axes 12*j* and 14*j*. However, the principal surfaces 12*b'* and 14*b'* may be constituted by planes almost perpendicular to the rotational axes 12*j* and 14*j*. Such a configuration is applied to, for example, a case in which Δθ is may be made small to a greater extent. In addition, the pitches of the principal surfaces 12*b'* and 14*b'* may not be necessarily completely the same.

Figure 7A:
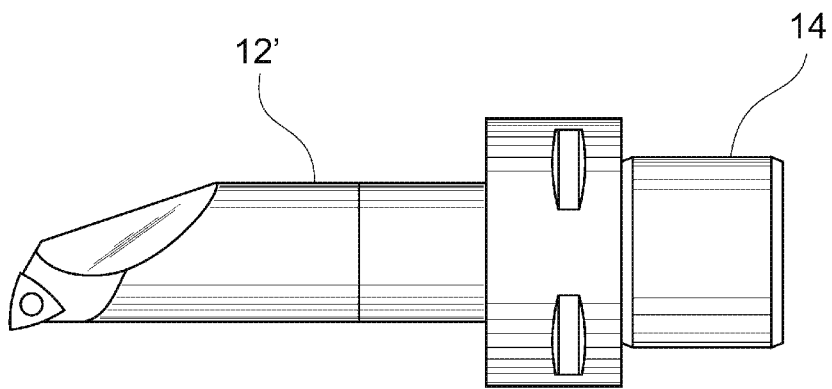
FIGS. 7A and 7B are views in which the fastening structure 10 is applied to heads 12' and 12".
Figure 7B:
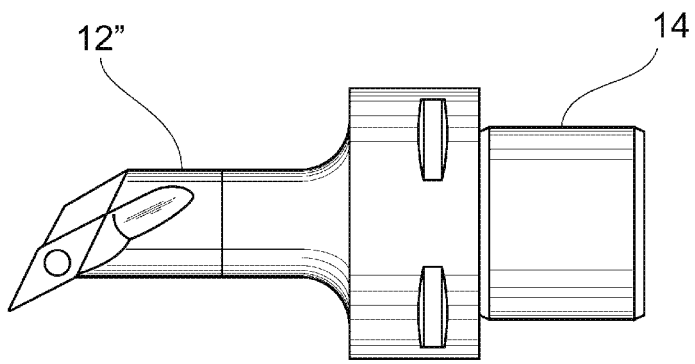

FIGS. 7A and 7B are views showing an applied example of the fastening structure 10 according to the embodiment. The fastening structure 10 according to the embodiment may be widely applied to a cutting tool in which different heads 12' and 12" are replaceable with respect to the same shank 14 as shown in FIGS. 7A and 7B, or the same head may be replaced with a new one. For example, the fastening structure 10 is suitably applicable not only to a fragile tool such as a cutting tool for inside-diameter groove processing but also to other rotational tools. The shank 14 may be a boring bar of a cemented carbide shank. In addition, the shank 14 may be integrally provided with an antivibration mechanism (damper). However, without being limited to the configuration, the shank 14 may not be provided with the antivibration mechanism.

As described above, the fastening structure 10, the shank 14, and the head 12 according to the embodiment enable positioning in the rotational direction using the key parts 12*k* and 14*k*. Therefore, it is possible to provide fastening structures having a high degree of freedom and applicable to cutting tools having various types or sizes (including, for example, cutting tools having an outside diameter of 16 mm or less) and provide heads and shanks used in the fastening structures. In addition, a coolant flow path passing through the inside of the fastening structure 10 may be formed. Therefore, it is possible to introduce a coolant near a place processed by a cutting insert.

What is claimed is:
1. A fastening structure comprising:
a head including a first end surface and a first screw part formed on the first end surface; and
a shank including a second end surface and a second screw part formed on the second end surface and threadedly engaging with the first screw part, wherein
the head includes a first axis;
the shank includes a second axis;
the first end surface includes a first principal surface extending transversely to an axial direction of the first screw part and a radially extending first step surface, the first end surface slanted in a circumferential direction at a first pitch,
the second end surface includes a second principal surface extending transversely to an axial direction of the second screw part and a radially extending second step surface the second end surface slanted in a circumferential direction at a second pitch, and
the first principal surface and the second principal surface face each other and the first step surface and the second step surface face and contact each other when the first screw part threadedly engages with the second screw part.
2. The fastening structure according to claim 1, wherein the first principal surface and the second principal surface contact each other when the first screw part threadedly engages with the second screw part.
3. The fastening structure according to claim 1, wherein the first pitch is smaller than a pitch of the first screw part.
4. The fastening structure according to claim 1, wherein the second pitch is smaller than a pitch of the second screw part.
5. The fastening structure according to claim 3, wherein the second pitch is smaller than a pitch of the second screw part.

6. The fastening structure according to claim 1, wherein
the first screw part includes a male screw, and
the second screw part includes a female screw.

7. The fastening structure according to claim 1, wherein
the head has a first through-hole extending in the axial direction of the first screw part, and
the shank has a second through-hole communicating with the first through-hole.

8. A head capable of being fastened to a shank including a second end surface and a second screw part formed on the second end surface, the second end surface including a second principal surface extending transversely to an axial direction of the second screw part and a radially extending second step surface, the second end surface slanted in a circumferential direction at a second pitch, the head comprising:
a first end surface; and
a first screw part formed on the first end surface and threadedly engaging with the second screw part, wherein
the first end surface includes a first principal surface extending transversely to an axial direction of the first screw part and a first step surface, the first end surface slanted in a circumferential direction at a first pitch, and
the first principal surface and the second principal surface face each other and the first step surface and the second step surface face each other when the first screw part threadedly engages with the second screw part.

9. The head according to claim 7, wherein
the first principal surface and the second principal surface contact each other when the first screw part threadedly engages with the second screw part.

10. The head according to claim 7, wherein
the first pitch is smaller than a pitch of the first screw part.

11. The head according to claim 7, wherein
the first screw part is a male screw, and
the second screw part is a female screw.

12. The head according to claim 9, wherein
the first screw part is a male screw, and
the second screw part is a female screw.

13. The head according to claim 7, wherein
the head is capable of being fastened to the shank having a second through-hole, and
the head has a first through-hole communicating with the second through-hole when the first screw part threadedly engages with the second screw part.

14. A shank capable of being fastened to a head including a first end surface and a first screw part formed on the first end surface, the first end surface including a first principal surface extending transversely to an axial direction of the first screw part and a radially extending first step surface, the first end surface slanted in a circumferential direction at a first pitch, the shank comprising:
a second end surface; and
a second screw part formed on the second end surface and threadedly engaging with the first screw part, wherein
the second end surface includes a second principal surface extending transversely to an axial direction of the second screw part and a radially extending second step surface, the second end surface slanted in a circumferential direction at a second pitch, and
the first principal surface and the second principal surface face each other and the first step surface and the second step surface face each other when the first screw part threadedly engages with the second screw part.

15. The shank according to claim 14, wherein
the first principal surface and the second principal surface contact each other when the first screw part threadedly engages with the second screw part.

16. The shank according to claim 14, wherein
the second pitch is smaller than a pitch of the second screw part.

17. The shank according to claim 14, wherein
the first screw part is a male screw, and
the second screw part is a female screw.

18. The shank according to claim 14, wherein
the first screw part is a male screw, and
the second screw part is a female screw.

19. The shank according to claim 14, wherein
the shank is capable of being fastened to the head having a first through-hole extending in the axial direction of the first screw part, and
the shank has a second through-hole communicating with the first through-hole when the first screw part threadedly engages with the second screw part.

* * * * *